US008315985B1

(12) United States Patent
Ohr et al.

(10) Patent No.: US 8,315,985 B1
(45) Date of Patent: Nov. 20, 2012

(54) OPTIMIZING THE DE-DUPLICATION RATE FOR A BACKUP STREAM

(75) Inventors: James Ohr, Saint Paul, MN (US);
Michael Zeis, Minneapolis, MN (US);
Dean Elling, Burnsville, MN (US);
Stephan Kurt Gipp, Inver Grove
Heights, MN (US); William DesJardin,
Roseville, MN (US)

(73) Assignee: Symantec Corporation, Mountain View, CA (US)

( * ) Notice: Subject to any disclaimer, the term of this patent is extended or adjusted under 35 U.S.C. 154(b) by 394 days.

(21) Appl. No.: 12/338,563

(22) Filed: Dec. 18, 2008

(51) Int. Cl.
*G06F 7/00* (2006.01)
(52) U.S. Cl. ............................ 707/664; 707/692; 707/753
(58) Field of Classification Search .................. 707/687, 707/692, 698, 664, 753
See application file for complete search history.

(56) References Cited

U.S. PATENT DOCUMENTS

| 7,747,584 | B1* | 6/2010 | Jernigan, IV | 707/692 |
| 2007/0179998 | A1* | 8/2007 | Swanepoel et al. | 707/204 |
| 2007/0220222 | A1* | 9/2007 | Boldt et al. | 711/162 |
| 2009/0013129 | A1* | 1/2009 | Bondurant | 711/115 |
| 2009/0132619 | A1* | 5/2009 | Arakawa et al. | 707/205 |
| 2009/0193223 | A1* | 7/2009 | Saliba et al. | 711/216 |
| 2009/0228599 | A1* | 9/2009 | Anglin et al. | 709/231 |
| 2010/0077161 | A1* | 3/2010 | Stoakes et al. | 711/162 |
| 2010/0088296 | A1* | 4/2010 | Periyagaram et al. | 707/705 |
| 2010/0169287 | A1* | 7/2010 | Klose | 707/692 |

OTHER PUBLICATIONS

Peter Elliman & Stefaab Vervaet, "Global Data Deduplication Results with NetBackup PureDisk", Nov. 2007, Symantec Technical Network White Paper, pp. 1-15.*
Youjip Won et al., "PRUN: Eliminating Information Redundancy for Large Scale Data Backup System", IEEE ICCSA, Jul. 2008, pp. 139-144.*
Chuanyi Liu et al., "ADMAD: Application-Driven Metadata Aware De-duplication Archival Storage System", IEEE SNAPI, Sep. 2008, pp. 29-35.*
Chuanyi Liu et al., "Semantic Data De-duplication for Archival Storage Systems", IEEE ACSAC, Aug. 2008, pp. 1-9.*
Nagapramod Mandagere et al., "Demystifying Data Deduplication", ACM Middleware Companion, Dec. 1-5, 2008, pp. 12-17.*

* cited by examiner

*Primary Examiner* — Cheryl Lewis
*Assistant Examiner* — Scott A Waldron
(74) *Attorney, Agent, or Firm* — Campbell Stephenson LLP

(57) ABSTRACT

A method and apparatus for optimizing a de-duplication rate for backup streams is described. In one embodiment, the method for optimizing data de-duplication using an extent mapping of a backup stream includes processing a backup stream to access an extent mapping associated with a plurality of data files, wherein the plurality of the data files are arranged within the backup stream and examining the extent mapping to identify at least one extent group within the backup stream, wherein the plurality of the data files are de-duplicated using at least one location of the at least one extent group.

18 Claims, 3 Drawing Sheets

OPTIMIZING THE DE-DUPLICATION RATE FOR A BACKUP STREAM

BACKGROUND

1. Field of the Invention

Embodiments of the present invention generally relate to data de-duplication systems and, more particularly, to a method and apparatus for optimizing a de-duplication rate for backup streams.

2. Description of the Related Art

Performing regular backups of mission critical data is an ineluctable affair for small to large organizations to prevent a data loss. Often, several copies of the same data are backed up over a storage lifecycle. As a result, a ten megabyte file is redundantly stored numerous times, which results in storage space and network bandwidth wastage. For example, a hundred users may receive a particular email as well as an attachment of a one megabyte (MB) file. If such an email is backed up, then each and every copy of the email is stored, requiring a hundred MB of storage space. To optimally balance storage space and network bandwidth requirements, data de-duplication techniques are employed.

Generally, the data de-duplication techniques identify redundant data in a backup stream (e.g., image based or volume based backups) and passes only unique data to a storage device. Conventional data de-duplication techniques may employ various algorithms such as a fixed sized algorithm (e.g., SHA-1 or MD5), a variable sized algorithm and/or the like, in different approaches (e.g., Hash or content aware based approaches). For example, in the fixed size algorithm based de-duplication techniques, the backup stream is segmented into data blocks of fixed size. Further, the data blocks are assigned unique values (e.g., a hash value). A new hash value of each data block of the backup stream is compared to a hash value of the data which is already stored on the storage device. If the new hash values do not match, then the corresponding data block of the backup stream is stored on the storage device and the new hash value is added to a lookup table. If the new hash value matches the hash value that is previously stored in the lookup table, then the data block is not backed up and thereby eliminating the redundant data. Further, composition of the corresponding data block may be recorded on the storage device to reconstruct a data file during succeeding restoration.

Typically, in an image or volume based backups, the backup stream is sent as a contiguous data stream. Further, if the fixed size algorithm based de-duplication technique is utilized, then the backup stream is segmented into fixed size data blocks in an exact sequence of the contiguous data stream and the redundant data is identified from the sequence of the data blocks. In one scenario, where different computing devices are interconnected to each other through a network (e.g., LAN, WAN and/or the like), an identical file may be stored on more than one storage devices.

Due to little or no organizational similarity for the storage devices, locations of identical files on different storage devices vary. As such, backup streams from different storage devices may differ. For example, a particular file may be an operating system file that is identical across a plurality of clients. However, the particular file may be stored at different locations within each partition. The de-duplication techniques cannot recognize identical data files at different locations within the backup streams. Hence, the fixed size based de-duplication technique cannot de-duplicate the backup stream efficiently, which reduces a de-duplication rate. Furthermore, various de-duplication techniques utilize details of file boundaries in the backup stream to remove the redundant data files. Because image-based backups are presented as one large file, the de-duplication techniques cannot determine data file boundaries, which reduces the de-duplication rate.

Therefore, there is a need in the art, for a method and apparatus for optimizing a de-duplication rate for backup streams.

SUMMARY OF THE INVENTION

Embodiments of the present invention comprise a method and apparatus for optimizing a de-duplication rate for backup streams. In one embodiment, a method for optimizing data de-duplication using an extent mapping of a backup stream includes processing a backup stream to access an extent mapping associated with a plurality of data files, wherein the plurality of the data files are arranged within the backup stream and examining the extent mapping to identify at least one extent group within the backup stream, wherein the plurality of data files are de-duplicated using at least one location of the at least one extent group.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
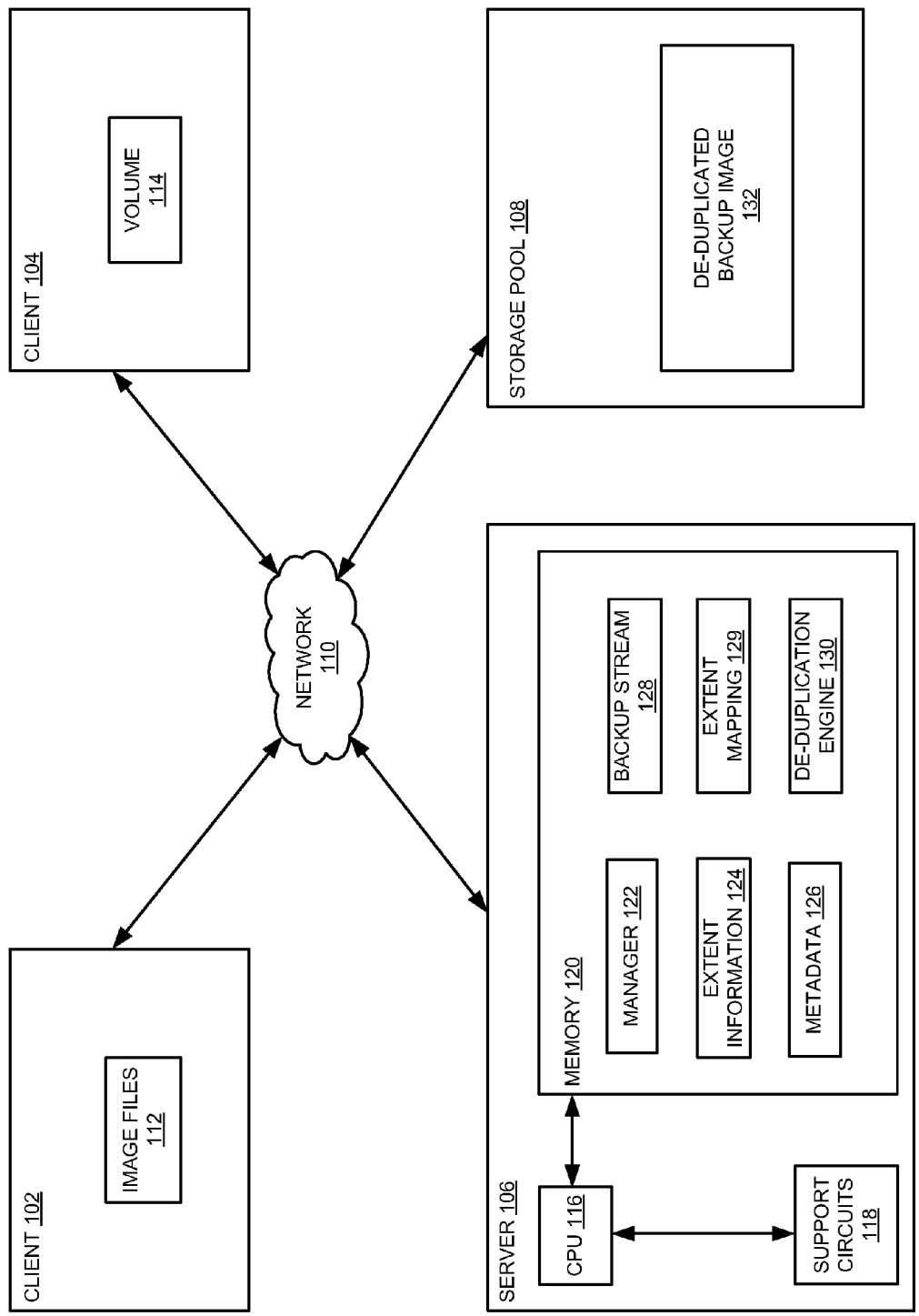
FIG. 1 is a block diagram of a system for optimizing a de-duplication rate of a backup stream in accordance with one or more embodiments of the present invention.

FIG. 1 is a block diagram of a system 100 for optimizing de-duplication of a backup stream according to one or more embodiments of the present invention. The system 100 includes a client 102, a client 104, a server 106 and a storage pool 108 where each is coupled to the other through a network 110.

The client 102 is a type of computing device (e.g., a laptop, a desktop, a Personal Digital Assistant (PDA), a mobile phone and/or the like), such as those generally known in the art. The client 102 includes various data, such as image files 112. Similarly, the client 104 is a type of computing device (e.g., a laptop, a desktop, a Personal Digital Assistant (PDA), a mobile phone and/or the like), such as those generally known in the art. The client 104 includes various data, such as a volume 114.

The server 106 is a type of computing device (e.g., a laptop, a desktop, a Personal Digital Assistant (PDA), a mobile phone and/or the like), such as those generally known in the art. The server 106 includes a Central Processing Unit (CPU) 116, various support circuits 118 and a memory 120. The CPU 116 may comprise one or more commercially available microprocessors or microcontrollers that facilitate data processing and storage. The support circuits 118 facilitate the operation of the CPU 116 and include one or more clock circuits, power supplies, cache, input/output circuits and the like. The memory 120 comprises at least one of Read Only Memory (ROM), Random Access Memory (RAM), disk drive storage, optical storage, removable storage and the like. The memory 120 includes various software packages, such as a manager 122 and a de-duplication engine 130. The memory 120 further includes various data, such as a backup stream 128, an extent mapping 129, extent group information 124 and metadata 126.

The storage pool 108 generally includes various components (i.e., hardware and software) that are configured to manage storage resources within a computing environment. The storage pool 108 generally includes one or more data storage devices (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) to the one or more data storage devices for one or more computing devices, such as the server 106. The storage pool 108 facilitates permanent storage (i.e., a backup) of critical computer data, such as the image files 112 and/or the volume 114, to backup media (e.g., sequential backup media (i.e., magnetic tape), optical storage media (e.g., hard disk) and/or the like).

The network 110 comprises a communication system that connects computers by wire, cable, fiber optic and/or wireless link facilitated by various types of well-known network elements, such as hubs, switches, routers and the like. The network 110 may employ various well-known protocols to communicate information amongst the network resources. For example, the network 110 may be a part of the Internet or intranet using various communications infrastructure such as Ethernet, WiFi, WiMax, General Packet Radio Service (GPRS) and the like. Furthermore, the network 106 may form a portion of a Storage Network Area (SAN) using various communications infrastructure such as Ethernet, Fibre Channel, InfiniBand, iSCSI and the like.

Generally, the image files 112 include one or more files in various formats for encapsulating and representing a hard disk, a block device, a virtual machine and/or a physical machine in a proprietary format. As an example, the image files 112 may include one or more virtual image files, such as virtual hard disk (VHD) files, virtual machine disk (VMDK) files and/or the like. As another example, the image files 112 may include one or more non-virtual machine image files, such as a disk image (.V2I) file created by SYMANTEC BackupExec software products.

Generally, the volume 114 comprises data organized and managed in accordance with a file system (e.g., New Technology File System (NTFS)). In one embodiment, the volume 114 further includes file system information and a plurality of objects (e.g., file system objects, such as files and directories). The file system information represents the organization, description and content of the plurality of objects that forms at least a portion the volume 114. As such, the file system information is the foundation of the volume 114. In one embodiment, the file system information includes metadata and/or offset mapping information, as described below. In another embodiment, the file system information is a Master File Table (MFT) including any non-resident information associated with any record of the Master File Table (e.g., non-resident data or attribute records). In this embodiment, the Master File Table comprises a plurality of records defining the plurality of objects that form the volume 114.

According to various embodiments, the image files 112 and/or the volume 114 may be stored in the backup stream 128 as one or more backups (e.g., a full backup, an incremental backup, a differential backup and/or the like). For example, the one or more backups may include a full backup and one or more incremental backups of the image files 112 and/or the volume 114. Furthermore, an incremental backup of the image files 112 and/or the volume 114 includes one or more modified and/or added data blocks and indicates any deleted data blocks since a previous backup (e.g., a previous incremental backup or a base full backup).

According to various embodiments, the backup stream 128 is a sequence of equal-sized data blocks. In one embodiment, the backup stream 128 may include a plurality of data files that are copied from the image files 112 and/or the volume 114. In another embodiment, the backup stream 128 is formed during a backup process of the data files within the image files 112 and/or the volume 114. During the backup process, the data files are streamed from the client 102 and/or the client 104 as the backup stream 128. For example, the backup stream 128 may include a .TAR archive file that further includes a .VMDK file for storing the data files as a raw partition. Furthermore, various portions of the data files are arranged within the backup stream 128 during the backup process. In other words, a data file having two or more data blocks may be arranged in a contiguous and/or non-contiguous manner within the backup stream 128. Moreover, the two or more data blocks may form an extent group for the data file.

Generally, an extent may be contiguous area of a computer memory for storing a particular file. As an example, an eight kilobyte (8 kB) cluster in a partition (e.g., a volume or an image file) may be an extent that corresponds with a MICROSOFT Word document file. If the word document file later exceeds eight kilobytes, then another extent having a size of eight kilobytes is provisioned. Notably, the extent may be located at an offset of ten megabytes (10 MB) from sector zero (0) of the partition. Furthermore, the another extent may be located at an offset of fifty megabytes (50 MB) and additionally, at an offset of eight kilobytes with respect to a beginning of the word document file. In other words, the extent and the another extent point to locations (e.g., memory addresses or offsets) of data blocks that correspond with the first eight kilobytes and the next eight kilobytes, respectively. As explained further below, the extent and the another extent may form a portion of an extent group for the MICROSOFT Word document file.

According to various embodiments, the extent mapping 129 provides locations within the backup stream 128 of one or more extents related to one or more data files. In one embodiment, the extent mapping 129 includes information, such as offset and size information, regarding the one or more extents within the backup stream 128. For example, the extent mapping 129 may be a file system mapping within a .TAR file (e.g., FSMAP in SYMANTEC NetBackup FlashBackup). In one embodiment, one or more known mapping techniques (e.g., SYMANTEC BackupExec Granular Restore Technology (GRT), VERITAS Mapping Service (VxMS), SYMANTEC NetBackup FlashBackup and/or the like) are utilized to determine the locations (e.g., offsets) of the one or more extents. Such locations are based on an organization of the one or more data files within the backup stream 128. In one embodiment, the locations of the one or more extents may be determined during the backup process that creates the backup stream 128.

According to various embodiments, the manager 122 is configured to process the backup stream 128. In one embodiment, the manager 122 utilizes various mapping techniques (e.g., VERITAS File System Mapping) as well as the metadata 126 (e.g., file names, modification times) to determine the extent mapping 129 of each and every data file within the backup stream 128. In another embodiment, the manager 122 examines the extent mapping 129 to identify one or more extent groups within the backup stream. Further, the extent group may refer to a number of extents of one or more data files of the backup stream 128. The manager 122 identifies and sorts one or more data files according to a first extent location (e.g., an offset of a starting extent). For example, the manager 122 identifies an offset and a size (i.e., a length) of a first extent of each data file. Then, the manager 122 sorts the one or more data files by the first extent offset.

According to various embodiments, one or more data files within the backup stream 128 may be arranged as one or more contiguous and/or non-contiguous data blocks within the backup stream 128. As such, the one or more contiguous data blocks form an extent group. Furthermore, one or more non-contiguous extents may be proximate and therefore, constitute near-contiguous extents. As such, the extent group may include the one or more near-contiguous extents. For example, an extent group may include one or more contiguous and/or near-contiguous data blocks associated with a particular data file within a single segment of the backup stream 128.

As such, the extent group information 124 includes locations (e.g., offsets) regarding one or more extent groups within the backup stream 128. For example, the extent group information 124 provides an offset and a size regarding one or more contiguous data blocks as well as one or more near-contiguous data blocks within the backup stream 128 that are associated with a particular data file of the plurality of data files. In one embodiment, the extent group information 124 includes a first extent location for each data file of the plurality of data files. For example, the extent group information 124 indicates an offset and a size of each first extent of the plurality of data files.

According to various embodiments, the metadata 126 includes various information (i.e., attributes) associated with the data files within the backup stream 128, such as an Access Control List (ACL), a file name, a size as well as time and date information regarding file modification, access creation and/or the like. The metadata 126 may further include permission information that indicates whether the data file is read only, read-write, archived and/or the like. In one embodiment, the manager 122 extracts the metadata 126 from a partition within the backup stream 128, such as the volume 114 and/or the image files 112. Furthermore, the manager 122 generates the extent group information 124 using the metadata 126. For example, the extent group information 124 indicates a file name, a first extent location (e.g., an offset) and size associated a particular data file.

In one embodiment, the manager 122 prepends the extent group information 124 to the backup stream 128. For example, the backup stream 128 may include one or more extent groups that begin with a first extent of each data file of the plurality of data files. As such, the extent group information 124 includes a location of the first extent as well as one or more remaining extents of the each data file. In one embodiment, the manager 122 may modify the extent mapping 129 such that an offset of an extent is translated into an offset that is relative to the backup stream 128.

According to various embodiments, the de-duplication engine 130 includes software code that is configured to identify and remove redundant data files within the backup stream 128. In one embodiment, the de-duplication engine 130 processes a single segment (e.g., a one hundred and twenty-eight Kb segment) of the backup stream 128 during an iteration of a de-duplication process. In one embodiment, the de-duplication engine 130 processes the extent group information 124 to identify and/or remove redundant data files within the backup stream 128.

In one embodiment, the de-duplication engine 130 may receive the backup stream 128, which includes the extent group information 124 stored between segments. In another embodiment, the de-duplication engine 130 receives the extent group information 124 before the backup stream 128. In yet another embodiment, the de-duplication engine 130 receives the extent group information 124 after the backup stream 128. In either embodiment, the de-duplication engine 130 uses the extent group information 124 to eliminate one or more redundant data files in order to de-duplicate the backup stream 128. For example, the de-duplication engine 130 uses the extent group information 124 to locate a first extent of a particular data file. If the particular data file is redundant, then the de-duplication engine 130 removes one or more extent groups associated with the particular data file. Subsequently, the de-duplication engine 130 communicates a de-duplicated backup stream to the storage pool 108, which is stored as the de-duplicated backup image 132.

According to various embodiments, the de-duplicated backup image 132 is a type of backup image (e.g., .V2I file, .TAR file and/or the like) which is de-duplicated prior to storage in the storage pool 108. In one embodiment, the de-duplicated backup image 132 includes an aggregation of de-duplicated data files. The de-duplicated backup image 132 may include one or more data files of various types (e.g., emails, word documents, aggregate data types, spreadsheets and/or the like). The one or more data files may be organized in as a raw volume or image (e.g., a virtual machine image).

For example, the de-duplicated backup image 132 may include a volume-level or image-level backup, such as a VMWARE Virtual Machine Disk backup, a Microsoft Virtual Hard Drive backup, a snapshot, a hard disk/partition backup and/or the like. In one embodiment, the de-duplicated backup image 132 may be a backup image (e.g., full backup image, an incremental backup image, a synthetic backup image and/or the like) generated by enterprise backup software (e.g., SYMANTEC NetBackup 6.5) to represent a storage state of a computing environment according to one or more embodiments.

Figure 2:
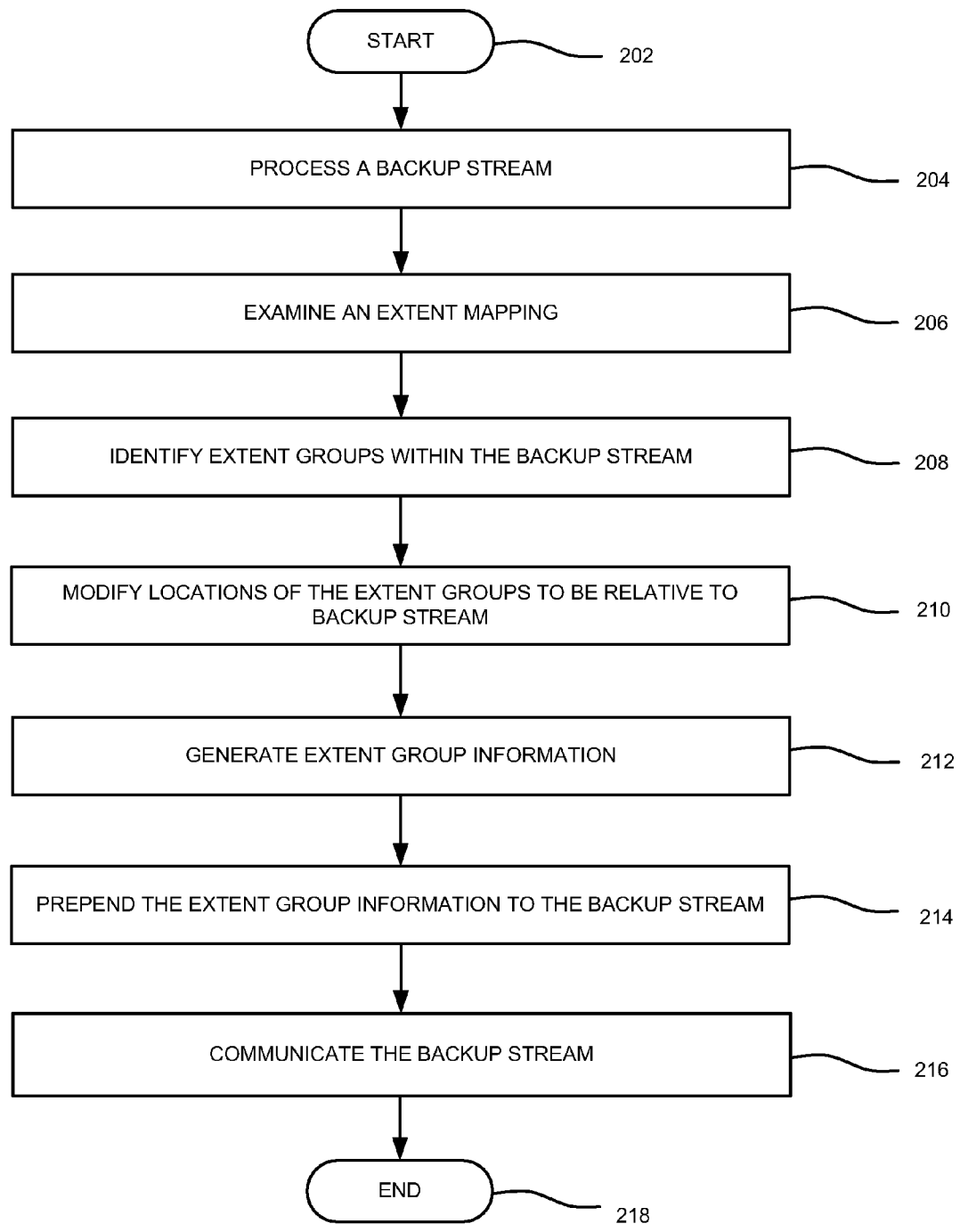
FIG. 2 is a flow diagram of a method for examining an extent mapping to generate extent group information accordance with one or more embodiments of the present invention.

FIG. 2 is a flow diagram of a method 200 for examining an extent mapping to generate extent group information according to one or more embodiments. The method 200 starts at step 202 and proceeds to step 204, at which a backup stream (e.g., the backup stream 128 of FIG. 1) is processed. In one embodiment, a manager (e.g., the manager 122 of FIG. 1) utilizes one or more mapping techniques on the backup stream to access an extent mapping (e.g., the extent mapping 129). The extent mapping indicates locations of one or more data files the backup stream. Such locations include offsets that are relative to the partition within the backup stream.

At step 206, the extent mapping is examined. After the step 206, the method 200 proceeds to step 208, at which extent groups within the backup stream are identified. In one embodiment, the extent mapping is examined to identify locations (e.g., offsets) and sizes of first extents (e.g., starting extents) of the one or more data files. As such, the extent groups include a first extent for each data file of the one or more data files. At step 210, locations of one or more extent groups are modified in relation to the backup stream. The step 210 proceeds to step 212, at which extent group information (e.g., the extent group information 124 of FIG. 1) is generated. In one embodiment, the extent group information provides first extent locations within the extent groups. At step 214, the extent group information is prepended to the backup stream. The step 214 proceeds to step 216, at which the backup stream is communicated to a de-duplication engine (e.g., the de-duplication engine 130 of FIG. 1). At step 218, the method 200 ends.

Figure 3:
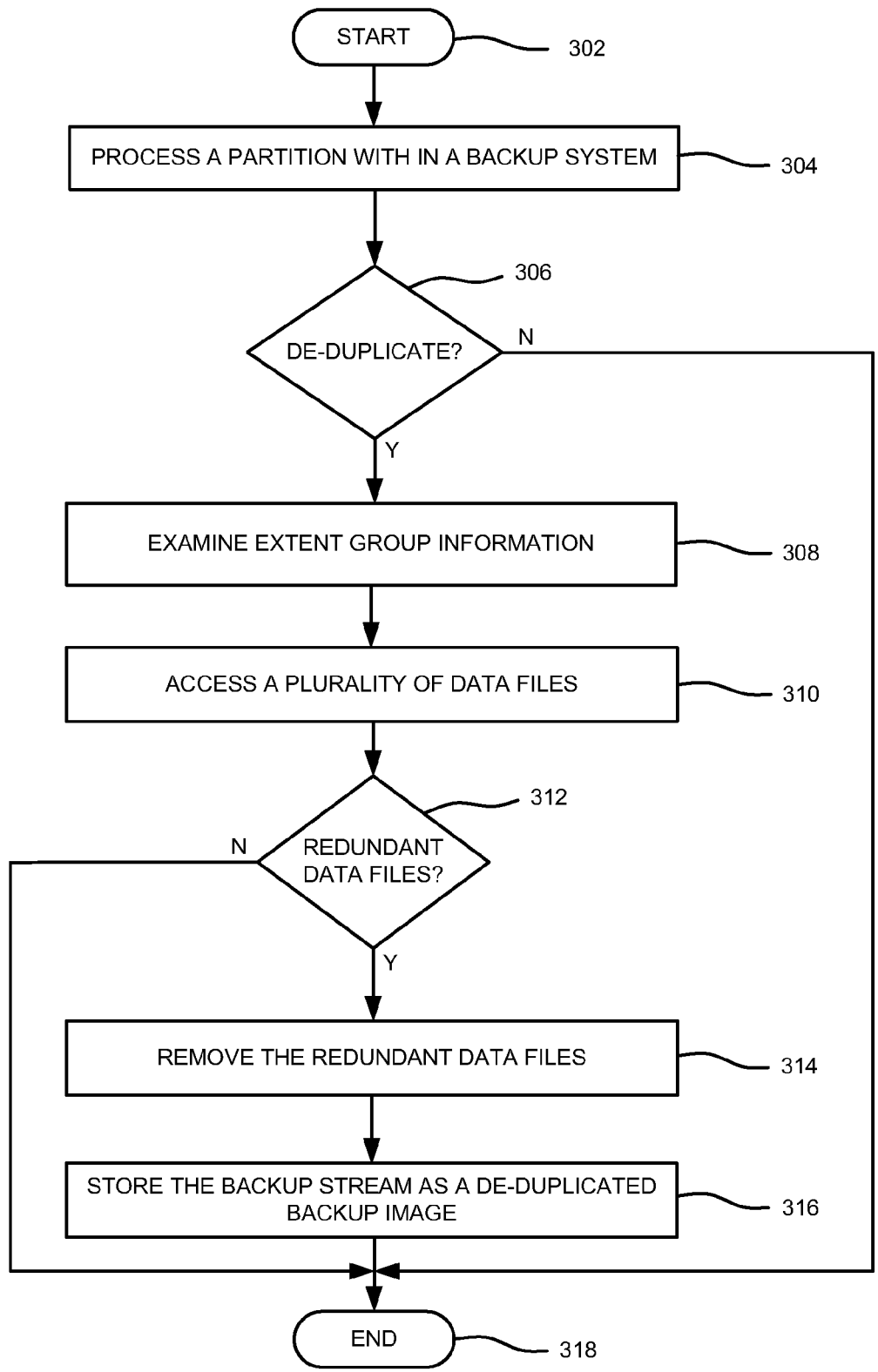
FIG. 3 is a flow diagram of a method for optimizing a de-duplication rate of a backup stream in accordance with one or more embodiments of the present invention.

FIG. 3 is a flow diagram of a method 300 for optimizing a de-duplication rate of a backup stream (e.g., the backup stream 128 of FIG. 1) according to one or more embodiments of the present invention. The method 300 starts at step 302 and proceeds to step 304, at which a partition (e.g., a volume, such as an NTFS volume or a virtual machine image, such as a .VMDK file) within the backup stream is processed. In one embodiment, the partition includes a plurality of data files.

At step 306, a determination is made as to whether the backup stream is to be de-duplicated. If, at the step 306, it is determined that the partition is not to be de-duplicated (option "NO"), then the method 300 proceeds to step 318. For example, the partition may not be de-duplicated if the partition is marked as read-only. If, it is determined that the partition is to be de-duplicated (option "YES"), then the method 300 proceeds to step 308. At the step 308, extent group information (e.g., the extent group information of FIG. 1) is examined.

The step 308 of the method 300 proceeds to step 310, at which the plurality of data files are accessed. In one embodiment, a de-duplication engine (e.g., the de-duplication engine 130 of FIG. 1) accesses the plurality of data files within the backup stream to identify one or more redundant data files within the backup stream. At step 312, a determination is made as to whether there are one or more redundant data files within the backup stream. If at the step 312, it is determined that there are no redundant data files within the backup stream (option "NO"), then the method 300 proceeds to the step 318. If, at the step 312, it is determined that there are one or more redundant data files within the backup stream (option "YES"), then the method 300 proceeds to step 314.

At the step 314, the redundant data files are removed from the backup stream in order to de-duplicate the backup stream. After the step 314, the method 300 proceeds to step 316, at which the backup stream is stored as a de-duplicated backup image (e.g., the de-duplicated backup image 132 of FIG. 1). In one embodiment, the de-duplicated backup image is stored in a storage pool (e.g., the storage pool 108 of FIG. 1). At the step 318, the method 300 ends.

While the foregoing is directed to embodiments of the present invention, other and further embodiments of the invention may be devised without departing from the basic scope thereof, and the scope thereof is determined by the claims that follow.

The invention claimed is:

1. A method comprising:
generating extent group information, wherein
the generating uses metadata extracted from a partition within a backup stream,
the extent group information comprises
information identifying one or more extent groups associated with a single data file of a plurality of data files,
the data files are arranged within the backup stream, and
each of the one or more extent groups comprises
a plurality of extents associated with the single data file;
prepending the extent group information to the backup stream;
modifying an extent mapping by translating at least one offset relative to the partition into at least one offset relative to the backup stream, wherein
the extent mapping comprises
information identifying the data files;
processing the partition within the backup stream, wherein
the processing comprises
sorting the data files according to a starting extent location of each data file of the data files,
identifying a first data file within the backup stream, wherein
the identifying the first data file locates the starting extent of the first data file, using the extent group information,
identifying a second data file within the backup stream, wherein
the identifying the second data file locates the starting extent of the second data file, using the extent group information, and
determining whether the second data file is redundant, wherein
the determining comprises
determining whether the second data file is a redundant data file of the first data file,
the starting extent of the each data file of the data files is identified by a first extent group within the extent group information, and
the first extent group comprises
information identifying one or more extents of the each data file of the data files; and
de-duplicating the backup stream, wherein
the de-duplicating is performed in response to a determination that the second data file is redundant, and
the de-duplicating comprises
removing at least one extent group associated with the second data file from the backup stream.

2. The method of claim 1, wherein the extent group information comprises at least one location of the first extent group.

3. The method of claim 1, wherein the extent group information further comprises:
a size and an offset of a first extent for the each data file of the data files.

4. The method of claim 1, further comprising:
communicating the extent group information to a de-duplication engine, wherein
the de-duplication engine is configured to de-duplicate the backup stream using at least one location of the at least one extent group, in response to receiving the extent group information.

5. The method of claim 1, further comprising:
identifying at least one of at least one contiguous data block or at least one near-contiguous data block associated with a data file of the plurality of data files within a single segment of the backup stream.

6. The method of claim 1, wherein
the at least one extent group further comprises at least one of at least one contiguous data block or at least one near-contiguous data block associated with a data file of the plurality of data files within a single segment of the backup stream.

7. An apparatus comprising:
a central processing unit (CPU); and
a manager configured to be coupled to the CPU and further configured to
generate extent group information, wherein the generating uses metadata extracted from a partition within a backup stream,
the extent group information comprises
information identifying one or more extent groups associated with a single data file of a plurality of data files,
the data files are arranged within the backup stream, and
each of the one or more extent groups comprises
a plurality of extents associated with the single data file;
prepend the extent group information to the backup stream;
modify an extent mapping by translating at least one offset relative to the partition into at least one offset relative to the backup stream, wherein
the extent mapping comprises
information identifying the data files;
process the partition within the backup stream, wherein
the manager is configured to process the partition within the backup stream by virtue of being configured to
sort the data files according to a starting extent location of each data file of the data files,
identify a first data file within the backup stream by locating the starting extent of the first data file, using the extent group information,
identify a second data file within the backup stream by locating the starting extent of the second data file, using the extent group information, and
determining whether the second data file is redundant by determining whether the second data file is a redundant data file of the first data file, wherein
the starting extent of the each data file of the data files is identified by a first extent group within the extent group information, and
the first extent group comprises
information identifying one or more extents of the each data file of the data files; and
de-duplicate the backup stream, in response to a determination that the second data file is redundant, wherein
the manager is configured to de-duplicate the backup stream by virtue of being configured to
remove at least one extent group associated with the second data file from the backup stream.

8. The apparatus of claim 7, wherein the extent group information further comprises:
a size and an offset of a first extent for the each data file of the data files.

9. The apparatus of claim 7, further comprising:
a de-duplication engine, wherein
the manager is configured to communicate the extent group information to the de-duplication engine, and
the de-duplication engine is configured to de-duplicate the backup stream using at least one location of the at least one extent group, in response to receiving the extent group information.

10. The apparatus of claim 7, wherein the extent group information comprises:
at least one location of the first extent group.

11. The apparatus of claim 7, wherein the manager is further configured to:
identify at least one of at least one contiguous data block or at least one near-contiguous data block associated with a data file of the plurality of data files within a single segment of the backup stream.

12. The apparatus of claim 7, wherein
the at least one extent group further comprises at least one of at least one contiguous data block or at least one near-contiguous data block associated with a data file of the plurality of data files within a single segment of the backup stream.

13. A system comprising:
a plurality of clients, wherein
each client comprises a plurality of data files;
a server, coupled to the plurality of clients and comprising a manager, configured to
generate extent group information, wherein the group information comprises
generate extent group information, wherein
the generating uses metadata extracted from a partition within a backup stream,
the extent group information comprises
information identifying one or more extent groups associated with a single data file of a plurality of data files,
the data files are arranged within the backup stream, and
each of the one or more extent groups comprises
a plurality of extents associated with the single data file;
prepend the extent group information to the backup stream;
modify an extent mapping by translating at least one offset relative to the partition into at least one offset relative to the backup stream, wherein
the extent mapping comprises
information identifying the data files;
process the partition within the backup stream, wherein
the manager is configured to process the partition within the backup stream by virtue of being configured to
sort the data files according to a starting extent location of each data file of the data files,
identify a first data file within the backup stream by locating the starting extent of the first data file, using the extent group information,
identify a second data file within the backup stream by locating the starting extent of the second data file, using the extent group information, and
determining whether the second data file is redundant by determining whether the second data file is a redundant data file of the first data file, wherein
the starting extent of the each data file of the data files is identified by a first extent group within the extent group information, and
the first extent group comprises
information identifying one or more extents of the each data file of the data files; and
de-duplicate the backup stream, in response to a determination that the second data file is redundant, wherein
the manager is configured to de-duplicate the backup stream by virtue of being configured to
remove at least one extent group associated with the second data file from the backup stream; and
a storage pool, coupled to the server and configured to store a de-duplicated backup image.

14. The system of claim 13, wherein the extent group information comprises:
   at least one location of the first extent group.

15. The system of claim 13, wherein the extent group information further comprises:
   a size and an offset of a first extent for the each data file of the data files.

16. The system of claim 13, further comprising:
   a de-duplication engine, wherein
      the manager is configured to communicate the extent group information to the de-duplication engine, and
      the de-duplication engine is configured to de-duplicate the backup stream using at least one location of the at least one extent group, in response to receiving the extent group information.

17. The system of claim 13, wherein the manager is further configured to:
   identify at least one of at least one contiguous data block or at least one near-contiguous data block associated with a data file of the plurality of data files within a single segment of the backup stream.

18. The system of claim 13, wherein
   the at least one extent group further comprises at least one of at least one contiguous data block or at least one near-contiguous data block associated with a data file of the plurality of data files within a single segment of the backup stream.

* * * * *